(12) United States Patent
McMurtry

(10) Patent No.: US 8,876,012 B2
(45) Date of Patent: *Nov. 4, 2014

(54) WATER SAVER SYSTEM

(76) Inventor: John L. McMurtry, Chico, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 13/304,858

(22) Filed: Nov. 28, 2011

(65) Prior Publication Data
US 2012/0118414 A1 May 17, 2012

Related U.S. Application Data

(63) Continuation-in-part of application No. 12/389,421, filed on Feb. 20, 2009, now Pat. No. 8,066,196.

(60) Provisional application No. 61/058,496, filed on Jun. 3, 2008.

(51) Int. Cl.
G05D 23/12 (2006.01)
E03B 7/04 (2006.01)
E03B 1/04 (2006.01)

(52) U.S. Cl.
CPC ............... *E03B 1/048* (2013.01); *E03B 7/045* (2013.01)
USPC ........................................ 236/12.13; 137/337

(58) Field of Classification Search
USPC ........... 236/12.1, 12.11, 12.13; 137/337, 468; 4/597
See application file for complete search history.

(56) References Cited

U.S. PATENT DOCUMENTS

| 4,155,506 | A | | 5/1979 | Brosenius |
| 4,160,461 | A | | 7/1979 | Vataru et al. |
| 4,924,536 | A | | 5/1990 | Houghton |
| 5,339,859 | A | | 8/1994 | Bowman |
| 5,452,740 | A | * | 9/1995 | Bowman .................. 137/337 |
| 5,564,462 | A | | 10/1996 | Storch |
| 5,689,843 | A | | 11/1997 | Duke et al. |
| 5,794,643 | A | | 8/1998 | Brice |
| 6,536,464 | B1 | | 3/2003 | Lum et al. |
| 6,588,377 | B1 | | 7/2003 | Leary et al. |
| 6,997,200 | B2 | | 2/2006 | King |
| 7,000,626 | B1 | | 2/2006 | Cress |
| 7,707,665 | B1 | | 5/2010 | Hong |
| 7,934,663 | B2 | | 5/2011 | Willsford et al. |
| 2002/0043224 | A1 | * | 4/2002 | Richter .................. 123/41.1 |
| 2004/0159353 | A1 | * | 8/2004 | King ...................... 137/337 |
| 2007/0246550 | A1 | * | 10/2007 | Rodenbeck et al. ........ 236/12.11 |
| 2009/0211644 | A1 | * | 8/2009 | Wylie et al. .................. 137/2 |

* cited by examiner

Primary Examiner — Marc Norman
(74) Attorney, Agent, or Firm — Berenato & White, LLC

(57) ABSTRACT

A water saver system that includes a temperature and touch sensitive valve, connected between the shower water control valves and the shower head, that diverts water to an accumulator tank until the water warms up. The temperature sensitive valve opens when the water reaches a preset temperature. The water stored in the accumulator tank flows back through a metering orifice and mixes with the warm water over the course of the shower so little water is wasted. The accumulator tank could be placed on the floor of the shower or outside the tub (under sink) in a retrofit or built into the wall stud cavity in new construction.

6 Claims, 10 Drawing Sheets

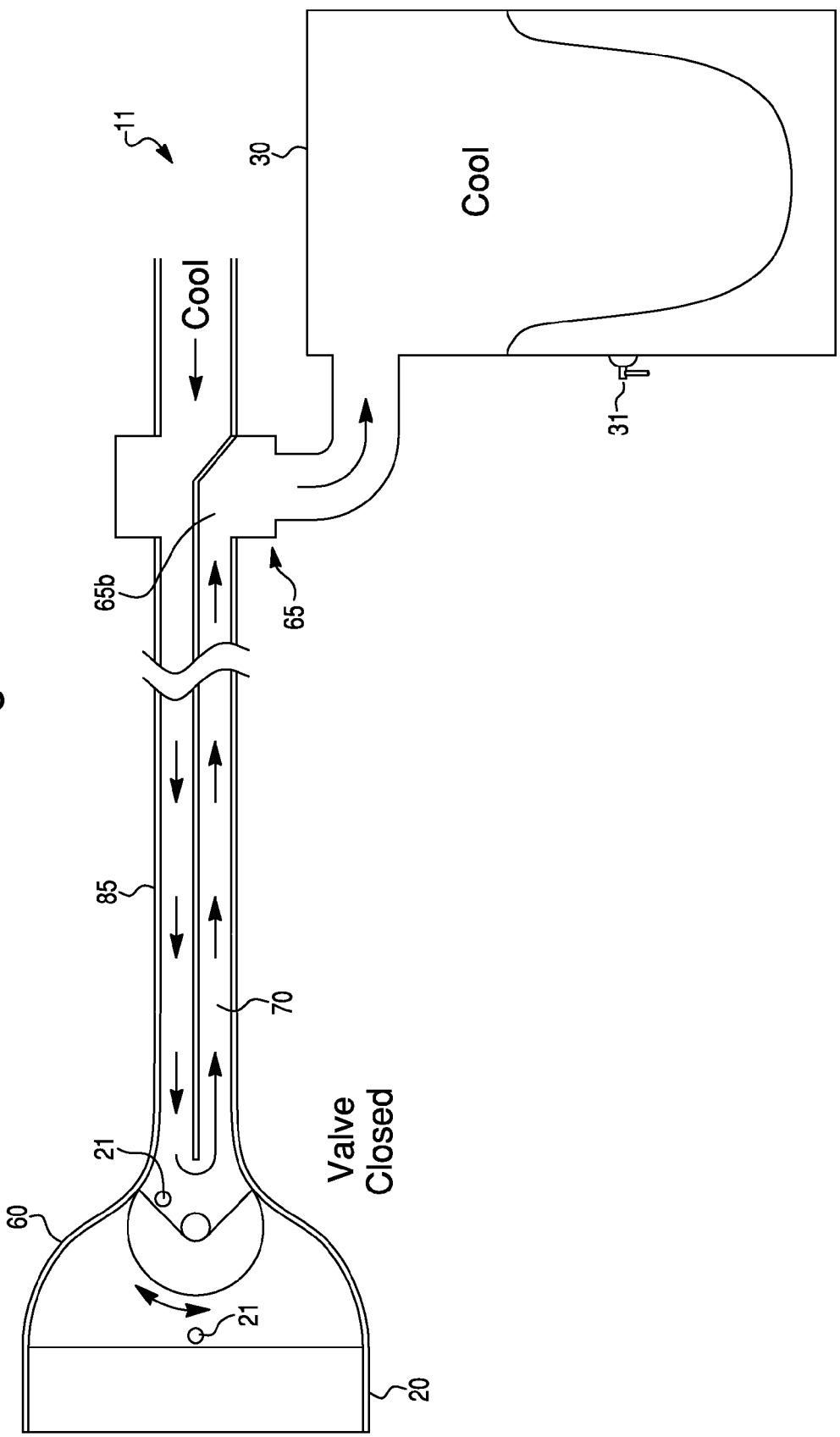

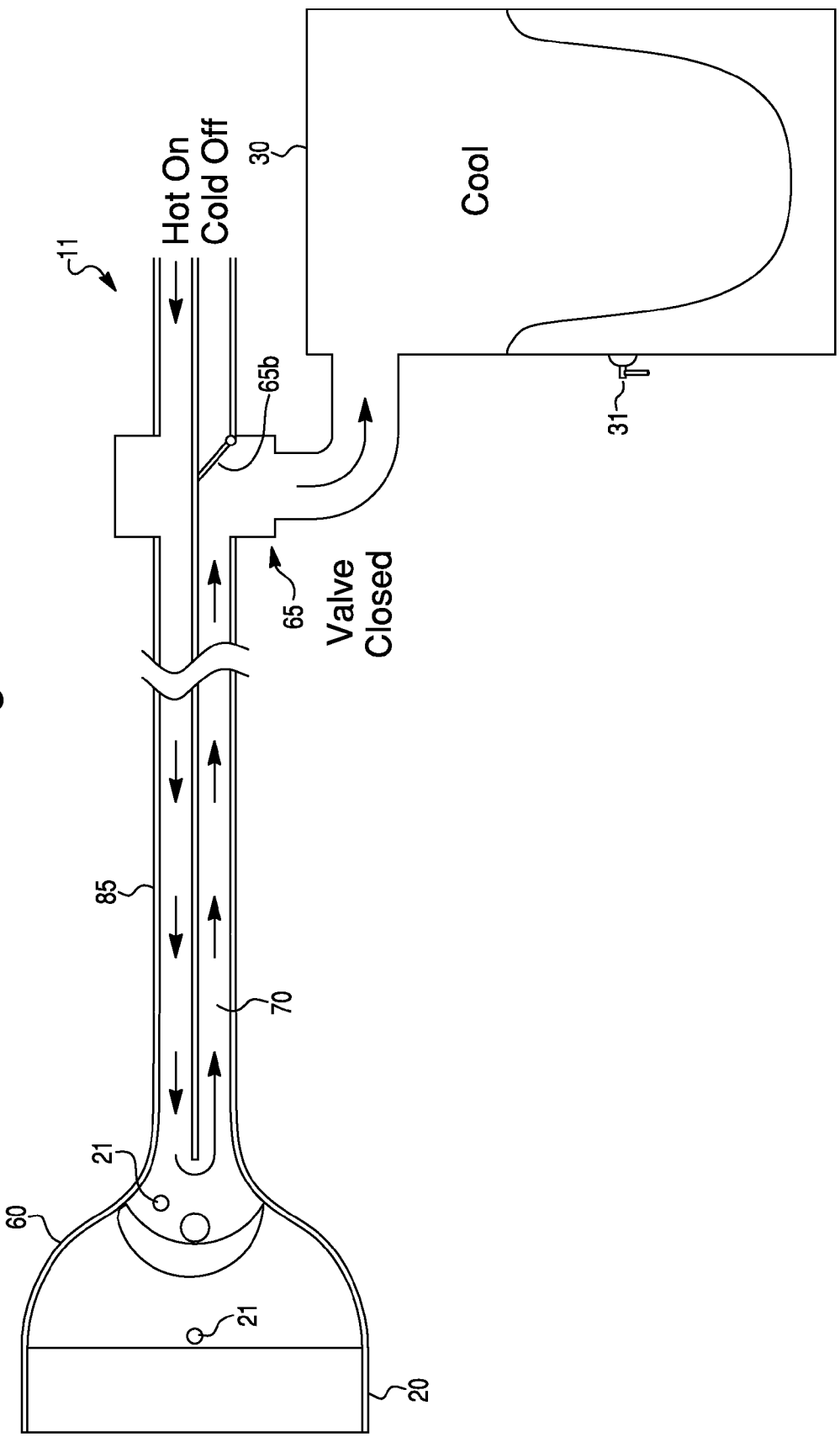

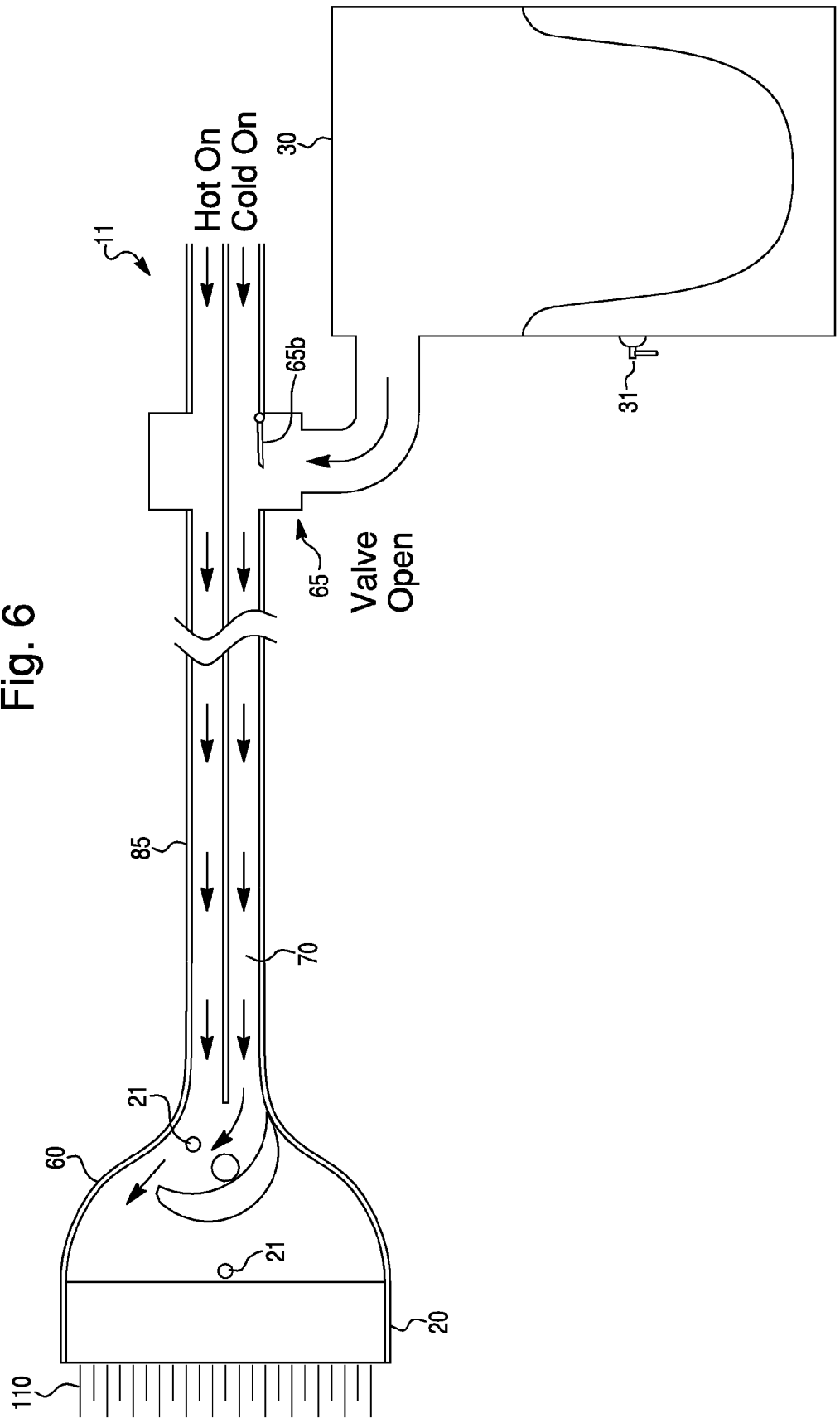

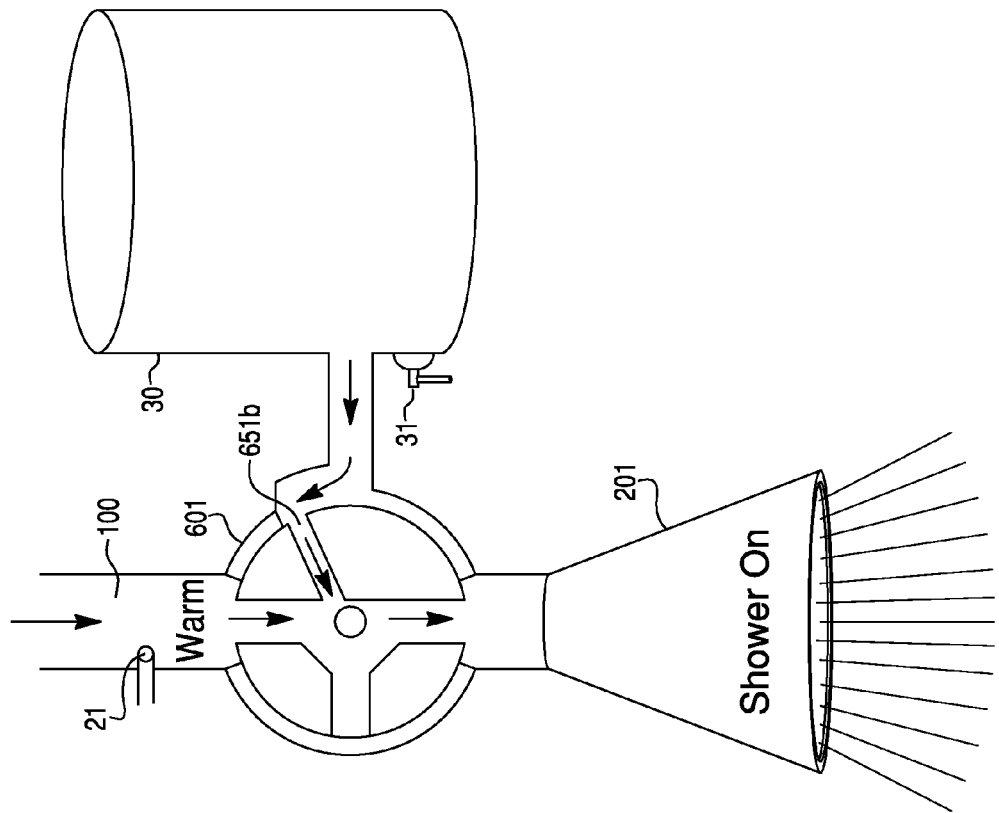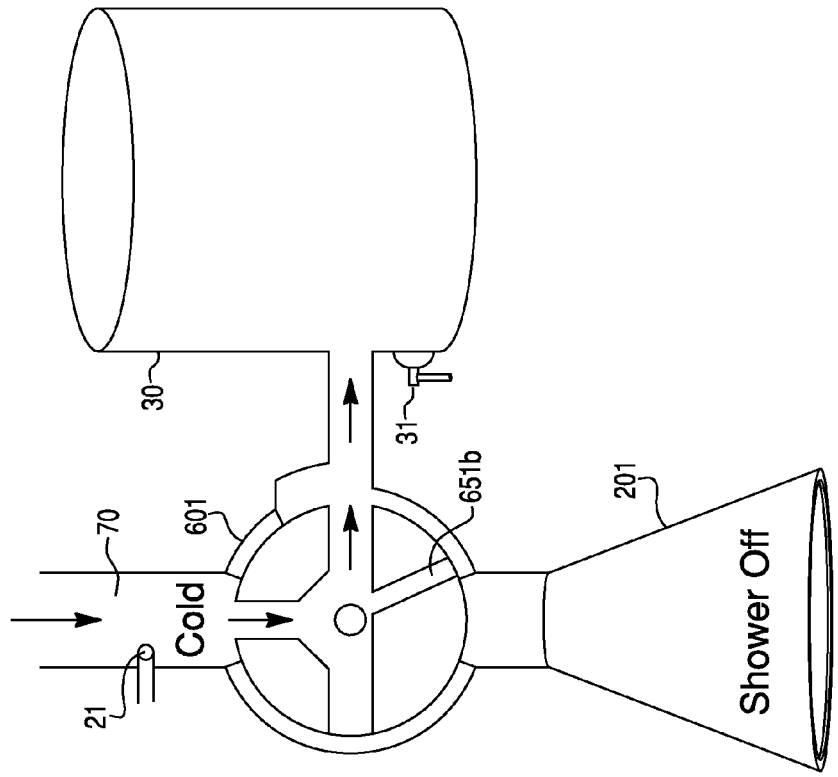

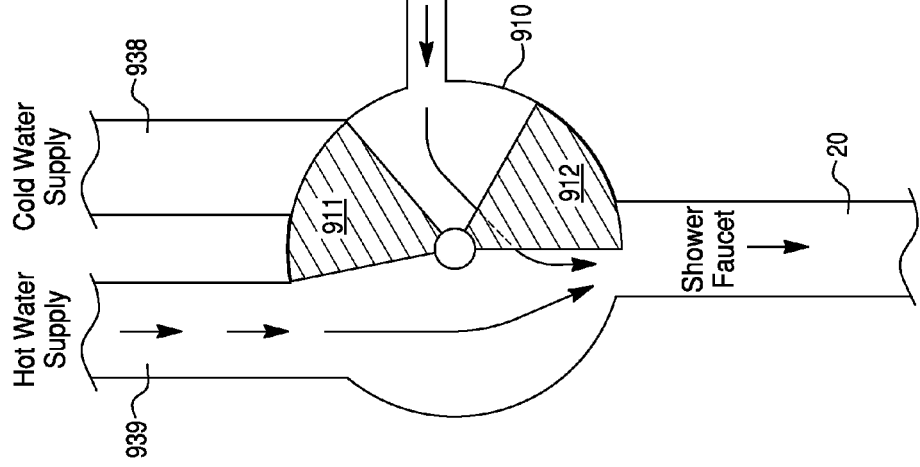
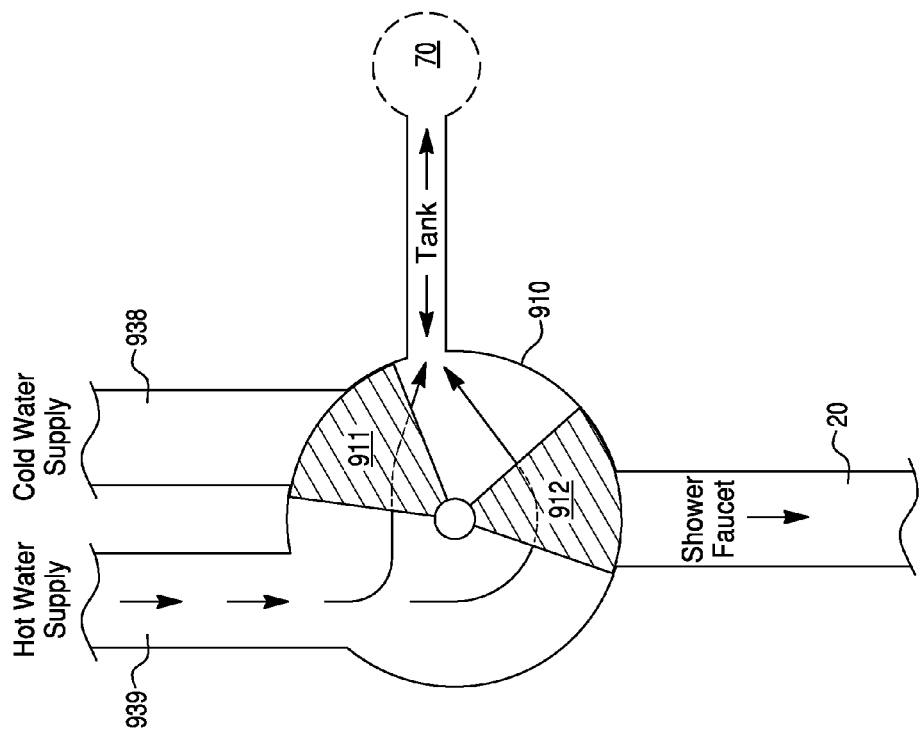

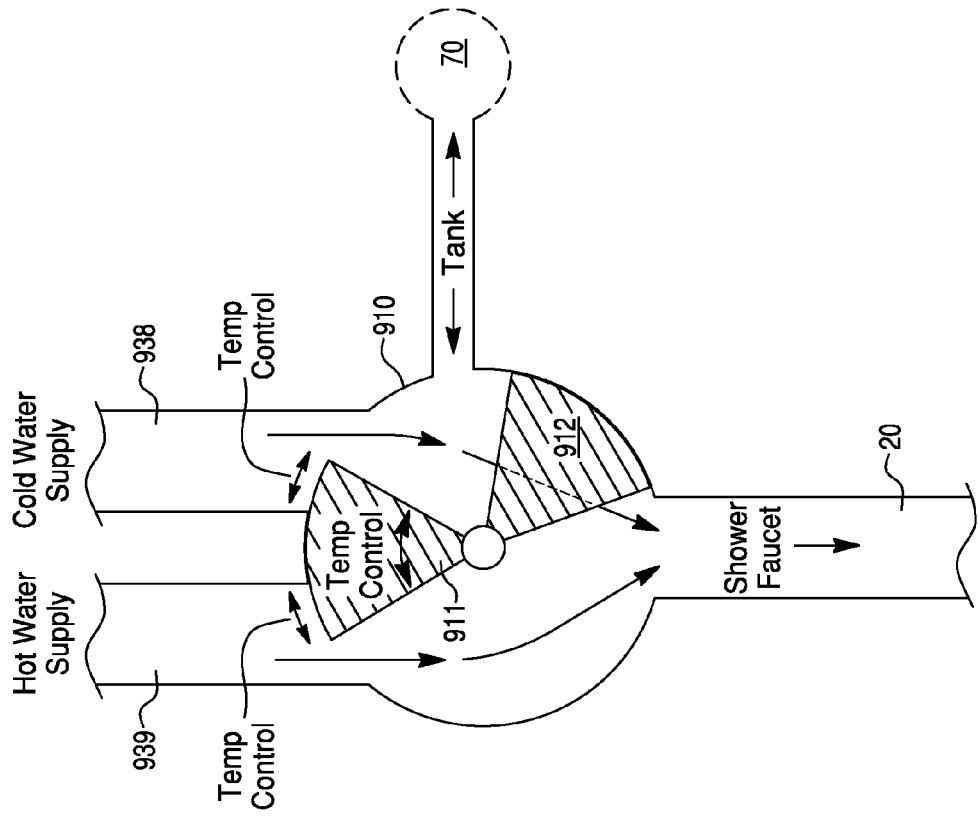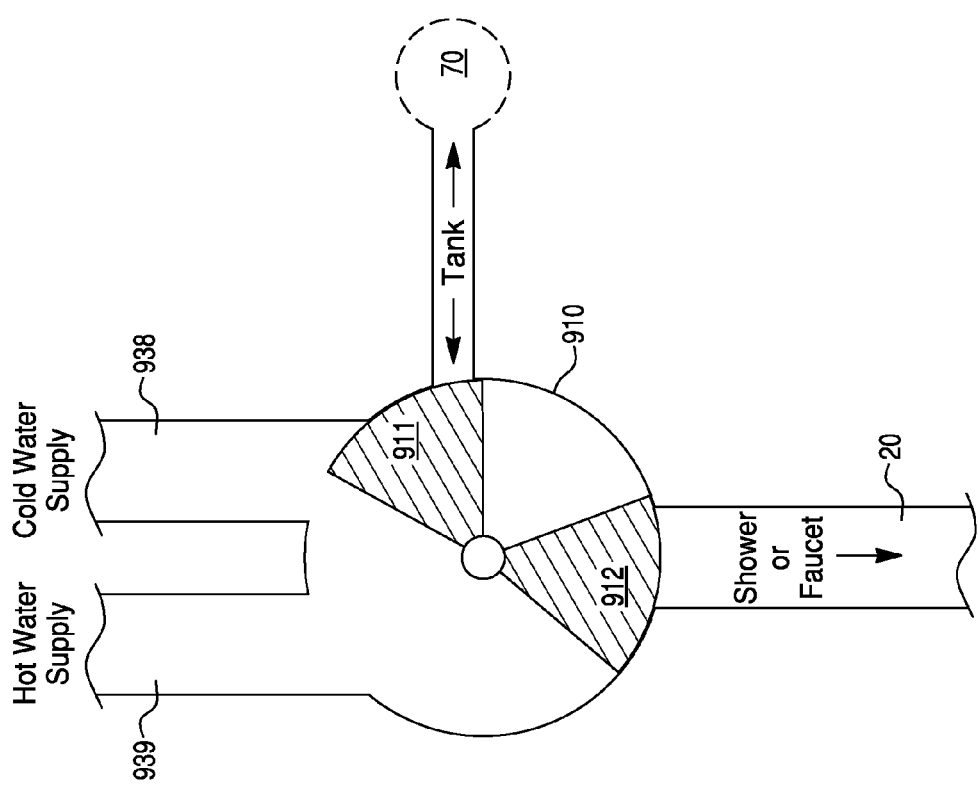

WATER SAVER SYSTEM

This application is a continuation-in-part of application Ser. No. 12/389,421, filed Feb. 20, 2009, now U.S. Pat. No. 8,066,196 which claims the benefit of U.S. Provisional filing 61/058,496, filed Jun. 3, 2008.

BACKGROUND OF THE INVENTION

1. Field of the Invention

The invention relates generally to a system that saves the cool water that is otherwise wasted when waiting for the water in a shower or sink to warm up, or in any other process where warm water is piped some distance and allowed to cool before re-use.

2. Background

There are a number of devices on the market that accomplish the same thing that this device does; they save the water that would otherwise go down the drain. However, known solutions generally contain clumsy phase change mediums, pumps, venturi devices that would plug up, buckets, complex plumbing, siphons, etc.

In contrast, the invention disclosed herein is very easy to install, even in retrofit situations. It could function mechanically without the need for electronics or active water return mechanisms if necessary. It is the most simple and best way to achieve the desired result of not wasting water simply because it is at the wrong initial temperature for use.

The water saver described herein relies on the dynamic pressure drop that occurs when the temperature-sensitive valve opens. This allows the cool water that has been stored in the pressure tank (accumulator) to be metered back into the system. No pump, venturi, phase change liquid or other active components are needed, or are optional, with the present invention to accomplish this outcome.

SUMMARY OF THE INVENTION

The present invention advantageously fills the aforementioned deficiencies by providing a water saver that saves the cool water that is otherwise wasted when waiting for the water in a shower or sink to warm up, or in any other process where warm water is piped some distance and, owing to sitting in the pipe un-used, is allowed to cool before the next use of hot water.

The cool water, that usually just flows down the drain while you stand with your hand in the stream waiting for the warm water to arrive, instead encounters a temperature-sensitive valve located at the shower (or tap) neck. This valve could be of several different types—bimetal (like an automobile engine thermostat), expanding wax, electronically actuated, polymeric etc. The valve diverts the water through a check valve metering assembly that allows the water to flow freely through a flexible hose toward a pressure tank. An orifice in the check valve meters the water more slowly when it flows back from the pressure tank. The pressure tank is preferably a bladder type accumulator, very much like those utilized in domestic water systems or water purification systems. When the warm water finally arrives at the temperature-sensitive diverter valve, the valve opens at a preset (adjustable) temperature. When the valve opens there is a localized systemic dynamic pressure drop that allows the cool water stored in the bladder pressure tank to flow back through the metering orifice in the check valve and mix with the warm systemic water now flowing. This metered cool water would have a slow flow rate, so while mixing with the warm water over the course of the shower, it wouldn't adversely affect the temperature of the shower. The valves used in this system could be mechanically or electronically actuated depending on the desired cost and sophistication. The device would be located externally when retrofitted and in the wall stud cavity in new construction. This same system could be used in sinks and any other applications wherever water is wasted while waiting for it to reach a desired temperature.

A check valve should be located downstream of the device to keep air from entering the system when the water is turned off. This would keep unwanted air from entering the bladder pressure tank. There should be a bypass lever or switch so that the system could be bypassed and/or drained when the tank is over-filled before warm water arrives. Much of this system could conveniently be built into the shower valve assembly for ease of new installation. The cool water return would inject the cool water at the shower valve assembly where there could be a temperature compensating valve. In sinks, the cool water return could be actuated only when the cold water side of the faucet is actuated. The basic diverter, pressure tank system still applies. A central bladder pressure tank could store all bypassed cool water and each fixture could be plumbed to it by a third cool water return line returning water from a temperature-sensitive diverter valve at each fixture. The same reliance on the pressure drop in the system when a cold water tap is opened would allow water to be returned from a central bladder pressure tank.

The device according to the present invention would not require any thought or input from the operator once it is installed. The device would allow a person to step into the shower, turn it on and get warm water at the very moment when the shower actually came on, i.e., had warmed sufficiently to de-activate the temperature sensitive by-pass valve. The result is predictable and comfortable, and would save thousands of gallons of water in the course of long term use.

Finally, it is an object of the present invention to provide a water saver that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 3 is a schematic showing the invention using a showerhead located auto control diverter valve, with the system in the "warm-up" phase, cold water diverted to the pressure tank.

FIG. 5 is a schematic showing the invention of FIG. 3 but using a manually controlled diverter valve, shown in the closed position with cold water stored in the pressure tank.

FIG. 6 is a schematic of the invention of FIG. 5 in the shower on, warm-up complete, with stored cold water bled into the system.

FIG. 7 is a schematic of a "ball valve" version of a diverter valve used in the present invention in the diverted position. The ball valve in this embodiment incorporates the return metering function into the ball valve.

FIG. 8 is a schematic of the ball valve shown in FIG. 7 in the return metering position.

FIGS. 9a-9d show operation of the device when equipped with a temperature and touch sensitive electrically operated combining valve.

DETAILED DESCRIPTION OF THE INVENTION

Figure 2:
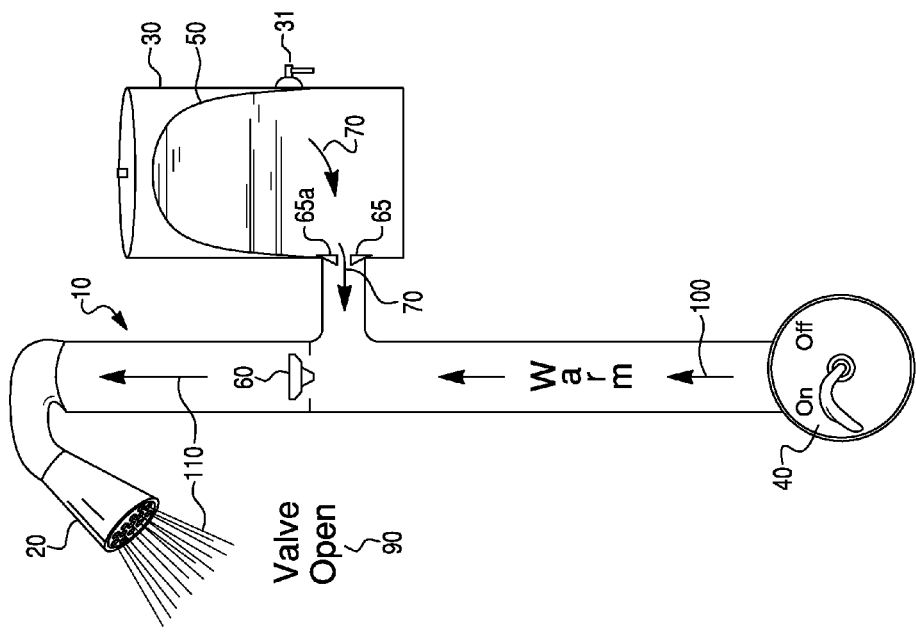
FIG. 2 is a side diagrammatic/schematic view of the water saver system in a second condition of warm water flowing from the supply line valve and out of the pressure tank.
Figure 1:
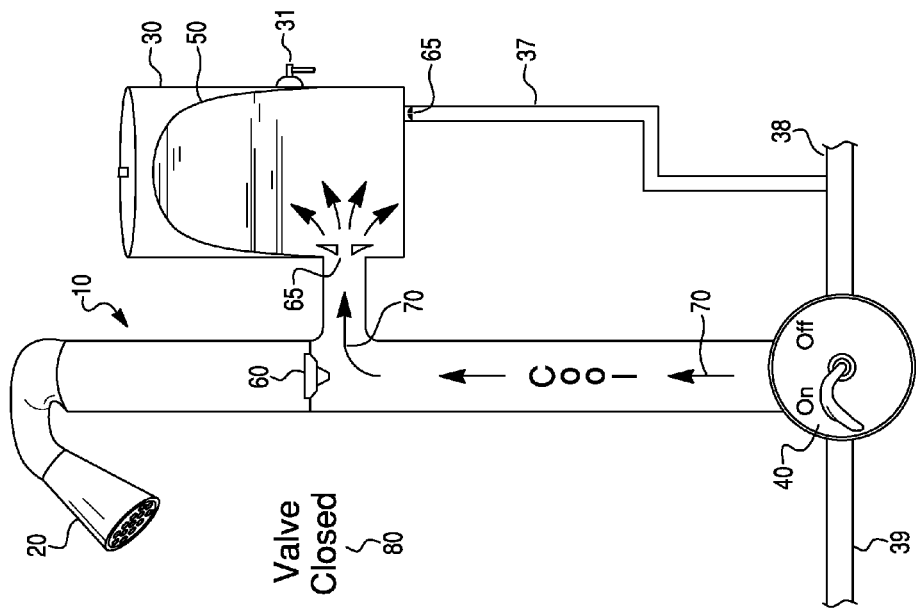
FIG. 1 is a side diagrammatic/schematic view of a water saver system in a first condition of cold water flowing from the supply line valve into a pressure tank.
Figure 4:
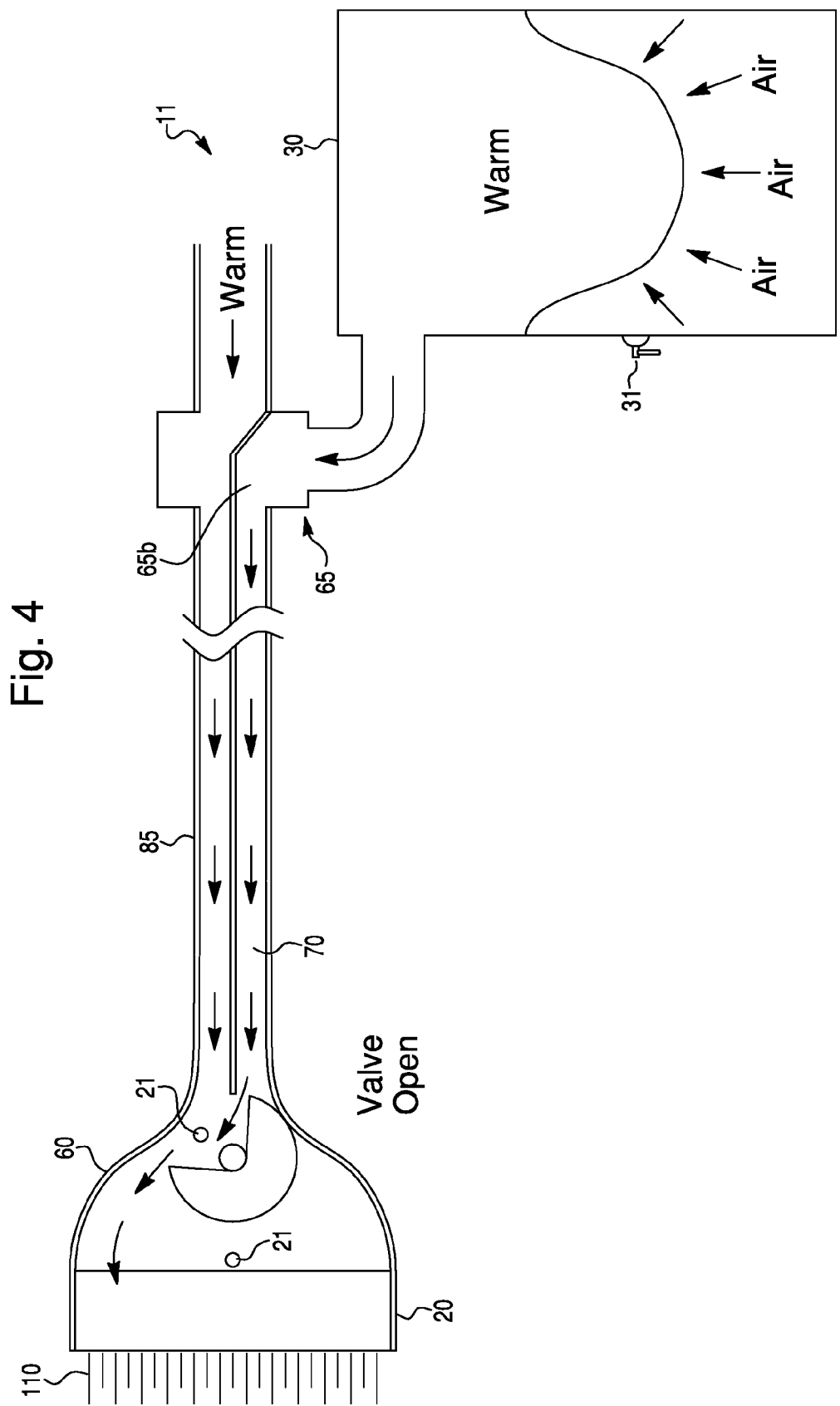
FIG. 4 is a schematic of the system of FIG. 4 with the diverter/control valve open shower on, warm-up complete, stored cold water bled into use.

With reference to the drawing FIGS. 1 and 2:

A typical plumbed hot/cold water supply fitted with the water saver system is shown. Cool water source (38) and hot water source (39) are combined through a combining valve (40). This combined water is then directed to a blended water user outlet (20) (shower head, sink tap).

The water saver of the present invention includes a "Tee" shaped manifold (10), which in a retrofit installation would be located between the shower neck (or valve 40) and the showerhead (20). The manifold would be an assembly containing a temperature-sensitive valve (60) (bimetal, polymer, expanding wax etc.) that is closed (FIG. 1) when the supply water temperature is below a predetermined temperature. This closed valve would force the cool supply water (70) to be diverted through a check valve (65), which would allow the water to enter a waterline attached to a bladder pressure tank (30) that includes a purge valve (31). The check valve (65) would open so that the cool water from the supply (70) would flow into the pressure tank (30) and would close when the temperature-sensitive valve (60) opened. The drop in supply pressure caused by the opening of the temperature-sensitive valve (60) would cause the cool water (70) stored in the pressure tank (30) to flow back (FIG. 2) into the "Tee" manifold (10) through a metering orifice (65a) located in the center of the check valve (65). There it would mix with the warm water supply (100). The metering orifice (65a) in the check valve (65) would allow the cool water (70) to mix with the warm supply water (100) at a rate predetermined by the orifice diameter. This would allow the cool diverted water (70) to be mixed with the warm supply water (100) at a rate that would not adversely affect the desired shower temperature (110). The functioning of these valves could be controlled mechanically or electronically depending on the desired technological sophistication and cost. The temperature sensitive valve 60, of which many currently exist for pre-programmed shower temper selection, should be readily user adjustable so as to allow for a cool shower and, if sink used, for cool water uses.

Alternatively, the accumulator (30) could be plumbed using another return (37) equipped with another check valve (65) to divert the stored cool water back to the overall plumbing system (household) cool water source (38). This system wide return could include a supplementary pump plumbed therein to match household pressure and thus empty the pressure tank as cool water demand is made anywhere in the household system. Alternatively, a balance valve could be plumbed into the return 37 to enable pressure tank accumulated water to precede household water into the household system until the tank is emptied. In this way, even if only cool water is demanded elsewhere in the overall system over a period of time, the accumulated water in pressure tank (30) can be re-cycled into the plumbed system with combining valve (40) remaining in the closed position. Likewise, several user outlets through a single plumbed system can be equipped with manifolds, all of which can be connected to a single pressure tank. The pressure tank can, upon sufficient pressure drops in the household system, and pump boosted as necessary, divert accumulated cool water back into the plumbed system cool water source for the household.

By providing appropriate flow restriction in the cold and hot water supply lines upstream of the device, any amount of pressure drop through the water saver (when the shower comes on) can be achieved. This is really the basis for how the device functions. The difference between the almost static supply pressure when the holding tank is filling, and the lower dynamic pressure when the shower comes on, allows the stored water to flow back into the system. The friction in the pipes provides most of the need restriction but more could be added, if necessary, to obtain any desired pressure differential.

With reference to FIGS. 3-6:

The alternate versions of the water saver of the present invention each include a showerhead (20) with a temperature control/diverter valve (60) in the showerhead (20). The showerhead (20) is an assembly containing a temperature-sensitive (FIG. 3) or manual control (FIG. 5) valve (60) (the auto control version of the valve could be electronic or bimetal, polymer, expanding wax etc.) that is closed (FIGS. 3 and 5) when the supply water temperature is below a predetermined temperature. This closed valve would force the cool supply water (70) to be diverted through a dual chamber shower supply hose (85) to a check valve (65), which would allow the water to enter a waterline attached to a bladder pressure tank (30). The check valve (65) would open so that the cool water from the supply (70) would flow into the pressure tank (30) and would close when the temperature-sensitive valve (60) opened. The drop in supply pressure caused by the opening of the temperature-sensitive valve (60) would cause the cool water (70) stored in the pressure tank (30) to flow back (FIGS. 4 and 6) through the dual chamber hose 85 via metering orifice (65(b)) located in the center of the check valve (65). There it would mix with the warm water supply (100). The metering orifice (65b) in the check valve (65) would allow the cool water (70) to mix with the warm supply water (100) at a rate predetermined by the orifice diameter, This would allow the cool diverted water (70) to be mixed with the warm supply water (100) at a rate that would not adversely affect the desired shower temperature (110). The functioning of the showerhead (20) valves (60) could be controlled mechanically or electronically depending on the desired technological sophistication and cost. The auto temperature sensitive valve (60) used in FIGS. 3 and 4 (battery powered or bi-metallic thermostat, etc.), of which many currently exist for pre-programmed shower temperature selection, should be readily user adjustable so as to allow for a cool shower and, if sink used, for cool water uses. Likewise, the manual version in FIGS. 5 and 6 could use color coded indicators (21) external to the showerhead (20) indicating to the user that is time to switch the water from diversion FIG. 5 to shower on FIG. 6.

The primary use of the FIGS. 3-6 versions are the retro-fits wherein the use of the system is as simple as replacing a showerhead. The system (11) is entirely self-contained and can be retrofitted to existing shower and sink equipment already in-place. The dual chamber hose 85 directly engages the sink faucet output or shower output, with the balance of the equipment (bladder tank 30, valve 65) engaged to a nearby surface, under sink, shower wall, etc., and the showerhead (20) hung in a conventional showerhead orientation from the self-contained system (11).

With reference to FIGS. 7 and 8.

The ball valve versions of the water saver of the present invention each include a showerhead (201) with a temperature control/diverter ball-valve (601) installed ahead of the conventional showerhead (201). The ball valve (601) is an assembly containing a temperature-sensitive feature or a manual control feature (the auto control version of the valve could be electronic or bimetal, polymer, expanding wax etc.) that diverts water (FIG. 7) when the supply water temperature is below a predetermined temperature. This diverted position valve would force the cool supply water (70) to be diverted to a bladder pressure tank (30). Upon sufficient warming of the supply water (100) the ball valve would reposition (FIG. 8) so that the cool water from the pressure tank (30) would be returned to the water supply going to the showerhead (201). The drop in supply pressure caused by the repositioning of the ball valve (601) would cause the cool water stored in the pressure tank (30) to flow back through the ball valve 601 via metering orifice (651(*b*)) located in the ball valve (601). There it would mix with the warm water supply (100). The metering orifice (651*b*) in the ball valve (601) would allow the stored cool water (70) to mix with the warm supply water (100) at a rate predetermined by the orifice diameter. This would allow the cool diverted water (70) to be mixed with the warm supply water (100) at a rate that would not adversely affect the desired shower temperature. The functioning of the ball valve (601) could be controlled mechanically with color temperature indicators 21 or electronically depending on the desired technological sophistication and cost.

As shown in FIGS. 9*a*-9*d* the device could also include a "Touch Switch", or capacitance switch that responds to an operator touch. A user could activate the shower hot 939 and cold supply 938 and await warm water as the diverter valve 910 directs water using valve elements 911/912 to the tank 70 as in FIG. 9*a*. Get wet when the water is up to temperature as in FIG. 9*b* using water supplied from the hot 939 and the stored cool tank water 70. Halt the water supply altogether as in 9*c*, lather up, and then, as in 9*d*, rinse using water at a pre-set temperature from a combination of hot 939 and cold 938 supply as well as stored tank 70 supply until finished. The temperature pre-set can be set using the temp control valve element 911 to vary the mix between hot 939 and cold supply 938. The total cut-off technique to lather and then rinse is the "military" shower method that yields greatest water savings.

This touch switch unit could be installed, thru adaptors, etc, to existing showers and sinks. The valve 910 handle would be attached through a precision variable resistor and an on/off switch. The switch would turn the water on/off as the handle was pulled/pushed or turned left/right. The variable resistor would allow for pre-set temperatures for the water to emerge from the shower/faucet. If only cold water is demanded at the sink, water flows immediately (teeth brushing) from cold supply 938, but where warm water is required (dish rinsing, etc.) the water saver system could be engaged with cool water initially diverted to the tank 70. Whenever mixing of cool water is necessary to cool the supplied hot water for whatever purpose, stored tank water 70 is the first source used until such stored water supply is exhausted. Thereafter, cool water supply 938 can be used. Whenever water flow is halted altogether, when the shower/faucet is used thereafter, the temperature resistor would determine whether diversion is necessary in accord with temperature demand of the user.

Figure 10:
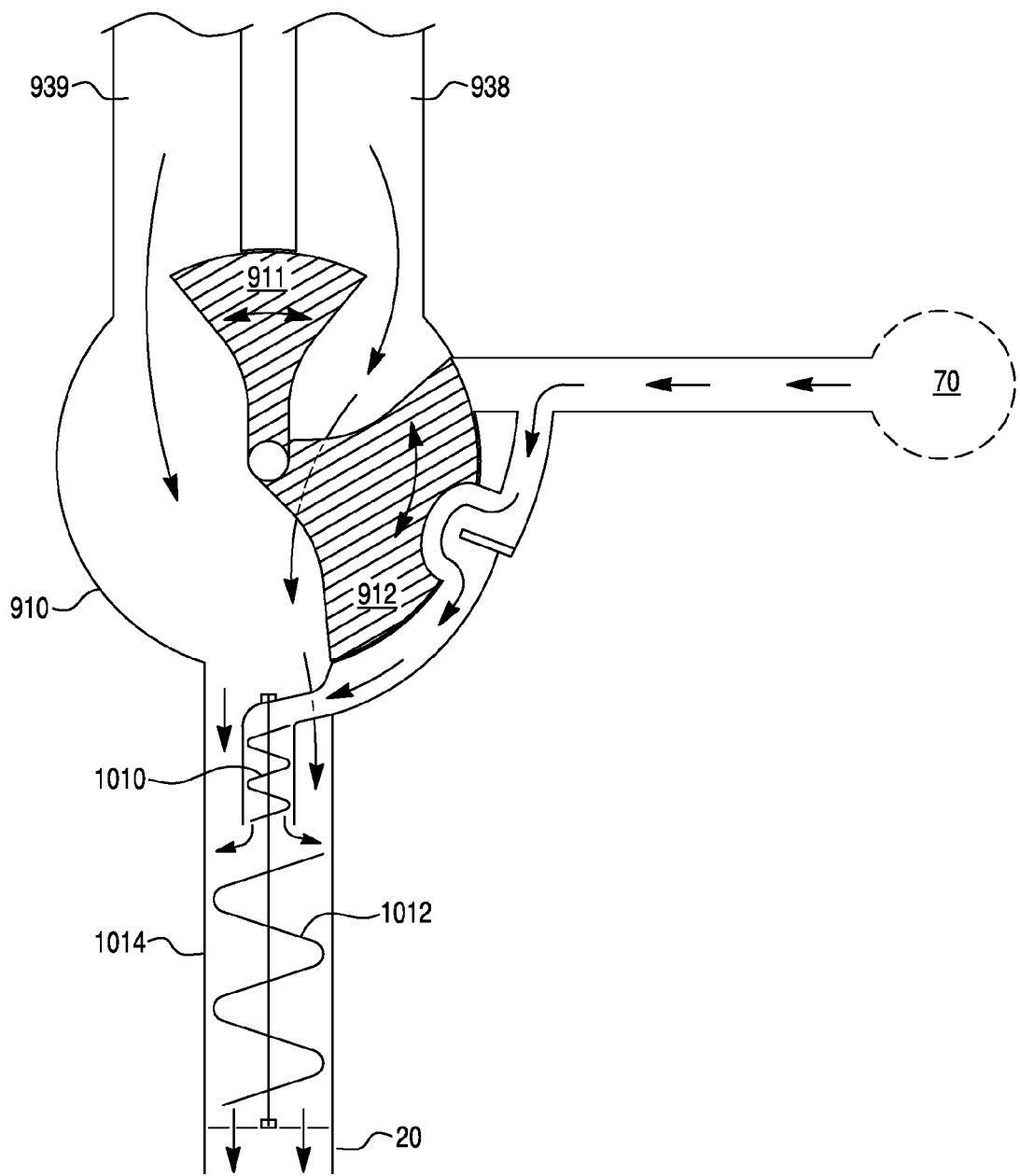
FIG. 10 shows a water saver equipped with a supplementary inline water pressure driven pump to assist in the emptying of the water storage tank.
Figure 11:
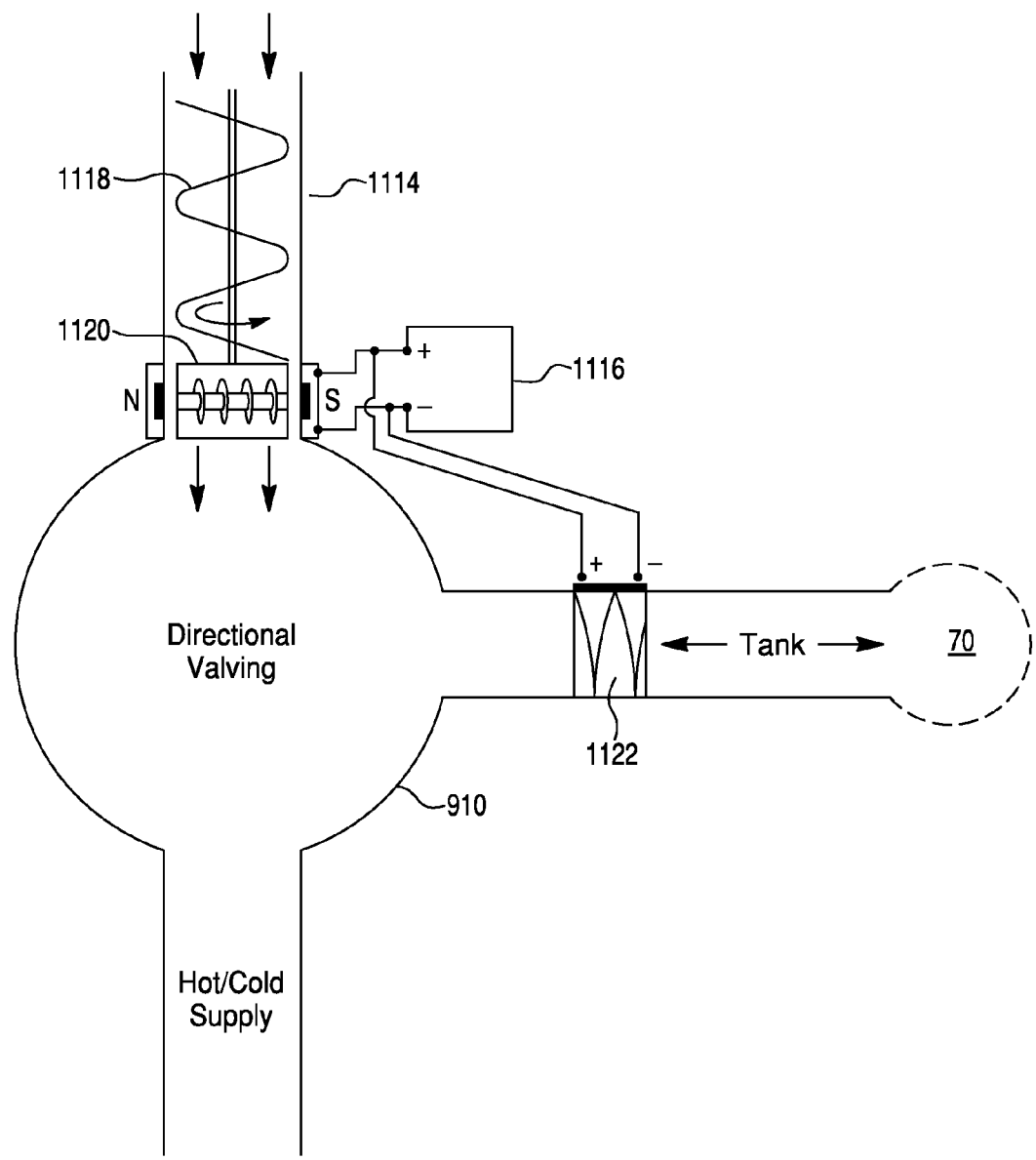
FIG. 11 shows a water saver system using a supplementary inline electrical generator for supplying/storing electrical power for operating the combining valve and storage tank supplementary pump.

It may be advantageous, in some instances, to eliminate the pressurized water tank and have it fed by gravity, where possible, or in a position suspended above the faucet or showerhead or, as the case may be, even supplied with a supplementary pump 1014 operated via supplied water flow, as in FIG. 10, or thru a small in-line generator and electrical power storage system 1114 as in FIG. 11. In FIG. 10, the water flowing thru diverter valve 910 could run an impeller 1012, a driving impeller, that in-turn ran a pump impeller 1010 located in the tank 70 sourced water line so as to draw water from the tank 70 and initiate a siphon/pump effect to draw stored water from tank 70 which, in this case, is non-pressurized. In FIG. 11, a generator 1120 is rotated by an in-line impeller 1118. The generated energy is stored in battery/capacitor 1116 to drive an auxiliary pump 1122 inline to the storage tank 70. The provision of a battery/capacitor 1116 charged by the inline generator 1114 could eliminate the need for a separate electrical supply for the valve electronics and the touch control system thereof.

It has been determined that a 3 gallon pressure tank 30 will accommodate most cooled water amounts stored in most household plumbing systems before hot water appears at the temperature sensitive valves. In addition, it has been determined that even a short shower lasting only 7 minutes is enough, with a cooled water return rate of ½ gallon per minute, to drain even a completely filled pressure tank within the time span of a shower. In the event warm water does not arrive at the temperature sensor before the pressure tank fills, the purge (by-pass) valve (31), included in each installed version, can be used to bleed out water until the temperature sensor encounters warm water. The purge valve can be located on the pressure tank or at the ball valve, showerhead, etc., i.e., any convenient location to simply allow system disabling when necessary.

The device, when used in new construction and integrated into the shower valve body, will have a temperature actuated/activated valve that allows cold water from the supply to flow only after hot water has arrived from the hot water supply at the valve fixture. This is because much of the water that is normally wasted (or would be stored by the water saver) results from waiting for the mixed flow (hot and cold water from the hot and cold supply mixed together) to reach the desired temperature. It is much more efficient to only allow the hot water supply to flow until the hot water in that line reaches the valve body, and only then allow cold water to mix with it. That way you are storing only the water residing in the hot water line that cooled between showers, not the total mixed flow from both lines that takes longer to reach the desired shower temperature.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims It is indeed intended that the scope of the invention should be determined by proper interpretation and construction of the appended claims and their legal equivalents, as understood by those of skill in the art relying upon the disclosure in this specification and the attached drawings.

The invention claimed is:

1. A water saver system, comprising:
  a plumbed water system including separate cold and hot water sources that combine at an electrically operated temperature and touch sensitive combining valve that respectively connects to a blended cold and hot water user outlet;

a manifold connected between said temperature and touch sensitive combining valve and said blended water outlet, said manifold being in fluid communication to divert water passing through said manifold that is below a pre-set temperature away from said blended water user outlet through a diverter outlet; and, an accumulator means, connected to said diverter outlet through an in-line check-valve, for accumulating water below said pre-set temperature until such time as said water passing through said manifold is at or above said pre-set temperature, whereupon, said accumulated water is returned through said check valve to said manifold, and thusly to said blended water user outlet at such time as said temperature and touch sensitive valve opens in response to rise in temperature of said water passing through said manifold above said pre-set temperature and contacting said temperature and touch sensitive valve.

2. A water system as in claim 1, wherein: electricity necessary to operate said temperature and touch sensitive valve is generated via an inline generator device driven by water supplied through said temperature and touch sensitive combining valve.

3. A water system as in claim 2, wherein: water returning to said temperature and touch sensitive combining valve from said accumulator means is pumped via an electrical auxiliary pump supplied with electrical power from said inline generator device.

4. A water system as in claim 1, wherein: water returning to said temperature and touch sensitive combining valve from said accumulator means is pumped via an inline impeller driven by water supplied through said temperature and touch sensitive combining valve.

5. A water system as in claim 1, wherein: said diverter valve is a multi-position ball valve located in said blended water outlet.

6. A water system as in claim 5, wherein: said diverter valve operates automatically in response to sensed temperature of water passing through said blended water outlet.

* * * * *